United States Patent
Blumenau et al.

(10) Patent No.: US 6,195,703 B1
(45) Date of Patent: *Feb. 27, 2001

(54) DYNAMIC ROUTING FOR PERFORMANCE PARTITIONING IN A DATA PROCESSING NETWORK

(75) Inventors: Steven M. Blumenau, Holliston; Yoav Raz, Newton, both of MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/103,996

(22) Filed: Jun. 24, 1998

(51) Int. Cl.⁷ .............................. G06F 13/38; G06F 15/17
(52) U.S. Cl. ...................... 709/238; 709/211; 709/229
(58) Field of Search ............................ 709/238, 231, 709/229, 226, 219, 105, 104; 714/4, 769, 770; 711/111, 113, 114, 150; 710/73; 370/352

(56) References Cited

U.S. PATENT DOCUMENTS

| | | | |
|---|---|---|---|
| 4,577,272 | 3/1986 | Ballew et al. | 364/200 |
| 5,146,605 | 9/1992 | Beukema et al. | 395/575 |
| 5,206,939 | 4/1993 | Yanai et al. | 395/400 |
| 5,335,352 | 8/1994 | Yanai et al. | 395/800 |
| 5,381,539 | 1/1995 | Yanai et al. | 395/425 |
| 5,461,611 | 10/1995 | Drake, Jr. et al. | 370/54 |
| 5,517,494 | 5/1996 | Green | 370/60 |
| 5,526,414 | 6/1996 | Bédard et al. | 379/221 |
| 5,544,313 | 8/1996 | Schachnai et al. | 395/200.01 |
| 5,544,327 | 8/1996 | Dan et al. | 395/250 |
| 5,544,347 | 8/1996 | Yanai et al. | 395/489 |
| 5,553,160 | 9/1996 | Dawson | 382/166 |
| 5,557,611 | 9/1996 | Cappellari et al. | 370/60.1 |
| 5,583,995 | 12/1996 | Gardner et al. | 395/200.09 |
| 5,619,497 | * 4/1997 | Gallagher et al. | 370/60 |
| 5,630,067 | 5/1997 | Kindell et al. | 395/200.09 |

(List continued on next page.)

FOREIGN PATENT DOCUMENTS

WO 97/16023    5/1997   (WO) ........................ H04N/7/173

OTHER PUBLICATIONS

Jadav et al., "Design and Evaluation of Data Access Strategies in a High Performance Multimedia-on-Demand Server," IEEE (1995).

Pan et al., "A Time-Scale Dependent Disk Scheduling Scheme for Multimedia-on-Demand Servers," IEEE (1996).

Fibre Channel—FAQ's Answers, Technology, Mar. 18, 1998, pp. 1–15; http://www.fibrechannel.com/technology/answer.htm.

(List continued on next page.)

Primary Examiner—Mark H. Rinehart
Assistant Examiner—Bunjob Jaroenchonwanit
(74) Attorney, Agent, or Firm—Howrey Simon Arnold & White, LLP

(57) ABSTRACT

A data network includes a switch that links a number of host processors to shared resources such as network ports of a cached storage subsystem. The switch routes resource requests from its inputs to selected ones of its outputs in accordance with programmed routing information. The routing information is changed dynamically based on measured loading characteristics of requests from the switch inputs or the respective hosts, in order to reduce the probability of blocked paths. In a specific example, respective subsets of output ports of the switch are assigned to each respective input port, the loading of each input port of the switch is measured, and the respective subset of output ports assigned to each input port are repetitively changed, and the respective subset of an input port is changed in response to blocking of the output ports assigned to the input port. A respective subset is selected based on the measured loading characteristics and a priority assigned to the input port, in order to balance loading on the output ports. In another specific example, a respective subset of the output ports is assigned to each host, based on host loading characteristics and a respective priority assigned to each host.

67 Claims, 10 Drawing Sheets

U.S. PATENT DOCUMENTS

| | | | |
|---|---|---|---|
| 5,646,676 | 7/1997 | Dewkett et al. | 348/7 |
| 5,689,678 | 11/1997 | Stallmo et al. | 395/441 |
| 5,727,151 | 3/1998 | Sugahara et al. | 709/231 |
| 5,734,830 | 3/1998 | Balogh et al. | 709/208 |
| 5,742,792 | 4/1998 | Yanai et al. | 395/489 |
| 5,748,905 | 5/1998 | Hauser et al. | 709/249 |
| 5,778,426 | 7/1998 | DeKoning et al. | 711/122 |
| 5,787,459 | 7/1998 | Stallmo et al. | 711/112 |
| 5,796,966 | 8/1998 | Simcoe et al. | 395/311 |
| 5,802,301 | 9/1998 | Dan et al. | 395/200.53 |
| 5,860,137 * | 1/1999 | Raz et al. | 711/202 |
| 5,862,403 * | 1/1999 | Kanai et al. | 395/826 |
| 5,884,103 | 3/1999 | Terho et al. | 395/892 |
| 5,892,915 | 4/1999 | Duso et al. | 395/200.49 |
| 5,892,924 | 4/1999 | Lyon et al. | 709/245 |
| 5,893,140 | 4/1999 | Vahalia et al. | 711/118 |
| 5,901,327 * | 5/1999 | Ofek | 395/825 |
| 5,907,837 | 5/1999 | Ferrel et al. | 707/3 |
| 5,914,939 * | 6/1999 | Serkowski et al. | 370/254 |
| 5,920,893 * | 7/1999 | Nakayama et al. | 711/147 |
| 5,933,603 | 8/1999 | Vahalia et al. | 395/200.55 |
| 5,935,205 * | 8/1999 | Marayama et al. | 709/216 |
| 5,940,870 * | 8/1999 | Chi et al. | 711/206 |
| 5,948,062 * | 9/1999 | Tzelnic et al. | 709/219 |
| 5,951,694 * | 9/1999 | Choquier et al. | 714/15 |
| 5,959,968 * | 9/1999 | Chin et al. | 370/216 |
| 5,978,951 | 11/1999 | Lawler et al. | 714/758 |
| 5,991,793 * | 11/1999 | Mukaida et al. | 709/104 |
| 6,009,535 * | 10/1999 | Halligan et al. | 714/5 |

OTHER PUBLICATIONS

Fiber Channel Tutorial, Technology, pp. 1–8, Mar. 7, 1998, pp. 1–8; http://www.fibrechannel.com/technology/tutorial, htm.

Networking Group, Internet–Draft, Paul J. Leach, Dilip C. Naik, "A Common Internet File System (CIFS/1.0) Protocol", Dec. 19, 1997, pp. 1–121.

Fibre Channel Overview, Zoltán Meggyesi, KFKI–RMKI, Research Institute for Particle and Nuclear Physics, Dec. 9, 1997; pp. 1–10, http://www1.cern.ch/HSI/fcs/spec/overview.htm.

Fibre Channel, TR–20–199x, "Fabric Loop Attachment" (FC–FLA) Rev.2.7, NCITS Working Draft Proposed Technical Report, Aug. 12, 1997, pp. i–xiv, 1–122.

TINA, "A Common Software Architecture for Multimedia Information Services" Emmanuel Darmois, Motoo Hoshi, Aug. 9, 1997, pp. 1–6. http://www.tinac.com/about/nutshell.htm;.

IEEE/IEEE Electronic Library, "Performance Model of the Argonne Voyager" Dixz, T.; Olson, R; Stevens, R.; Div. of Math & Comput.Sci.,Argonne Nat. Lab, IL, USA; Application–Specific Systems, Architectures and Processors 1997, Jul. 14–16, 1997, pp. 316–327.

IEEE/IEE Electronic Library, "Scheduling for Interactive Operations in Parallel Video Servers" Min–You Wu; Wei Shu, Dept. of Comput. Sci., State Univ. of New York, Buffalo, NY; Multimedia Computing and Systems '97, Jun. 3–6, 1997, pp. 178–185.

IEEE/IEE Electronic Library, "On The Efficient Retrieval of VBR Video in a Multimedia Server" Sambit Shau; Zhi–Li Zhang; Kurose, J.; Towsley, D. Dept. of Comput. Sci., Massachusetts Univ., MA. Multimedia Computing and Systems '97 Jun. 3–6, 1997, pp. 46–53.

IEEE/IEE Electronic Library, "Scheduling of Storage and Cache Servers For Replicated Multimedia Data" Park Kyeongho; Yanghee Choi; Chong Sang Kim, Dept. of Comput. Eng., Seoul Nat. Univ., South Koria; High Performance Computing on the Information Superhighway, 1997 HPC Asia '97, Apr. 18–May 1, 1997, pp. 484–487.

Fibre Channel, Fabric Generic Requirements (FC–FG) Rev. 3.5; ANSI X3.289–199x; X3T11/Project958–D; Working Draft Proposed American National Standard for Information Systems, Aug. 7, 1996, pp. i–x, 1–23.

IEEE/IEE Electronic Library, "The Design and Implementation of a Multimedia Storage Server to Support Video–On–Demand Applications" Molano, A.; Garcia–Martinez, A.; Vina A.; Univ. Autonoma de Madrid, Spain; Euromicro, Conference, Sep. 2–5, 1996, pp. 564–571.

IEEE/IEE Electronic Library; "Techniques for Increasing the Stream Capacity of a Multimedia Server" Jadav, D.; Choudhary, A.; ECE Dept., Syracuse Univ., NY, $3^{rd}$ Intl. Conf. on High Performance Computing, 1996, Dec. 19–22, 1996, pp. 43–48.

IEEE/IEE Electronic Library, "MMPacking: A Load and Storage Balancing Algorithm for Distributed Multimedia Servers" Serpanos, D.N.; Georgiadis, L.; Bouloutas, T.; IBM Thomas J. Watson Res. Center, Yorktown Heights, NY; 1996 IEEE Int'l Conf. on Computer Design VLSI in Computers and Processors, Oct. 7–9, 1996, pp. 170–174.

Fibre Channel, Generic Services (FC–GS) Rev. 3.1, dpANS X3.288–199xX3T11/Project 1050D; Working Draft Proposed American National Standard for Information Systems, Aug. 7, 1996, pp. i–xiv, 1–84.

RFC 1910, RFC Archive; "User–Based Security Model for SNMPv2", G. Waters, Editor, Bell–Northern Research Ltd., Feb. 1996, pp. 1–40.

IEEE/IEE Electronic Library, "High–Performance VOD Server AIMS" Nishikawa, K.; Egawa, H.; Kawai, O.; Inamoto, Y.; Fujitsu Labs. Ltd., Kawasaki, Japan; Global Telecommunications, Conference, Nov. 13–17, 1995, pp. 795–798.

Fibre Channel Arbitrated Loop (FC–AL) Rev. 4.5; X3.272–199xX3T11/Project 960D; Working Draft Proposal American National Standard For Information Technology, Jun. 1, 1995, pp. i–x, 1–92.

IEEE/IEE Electronic Library, "Multimedia Servers—design and Performance" Ghafir, H.; Chadwick, H.; IBM Corp., Bethesda, MD; Global Telecommunications Conference, Nov. 28–Dec. 2, 1994, pp. 886–890.

IEEE/IEE Electronic Library, "Multimedia Storage Servers: A Tutorial" Gemmell, D.J.; Vin, H.M.; Kandlur, D.D.; Venkat Rangan, P.; Rowe, L.A.; Simon Fraser Univ., Burnaby, BC, Canada; Computer, May 1995, pp. 40–49.

IEEE/IEE Electronic Library, "An Observation–Based Admission Control Algorithm For Multimedia Servers" Vin, H.M.; Goyal, A.; Goyal, A.; Goyal, P.; Dept. of Comput. Sci., Texas Univ., Austin, TX; International Conference on Multimedia Computing and Systems, 1994, May 15–19, 1994, pp. 234–243.

"Symmetrix Model 55XX Product Manual, P/N 200–810–550 Rev D" EMC Corporation, Hopkinton, Mass., May 1994, pp. 1–236.

IEEE/IEE Electronic Library, "Data Organization and Storage Hierarchies in a Multimedia Server" Christodoulakis, S.; Anestopoulos, D; Argyropoulos, S.; Tech. Univ. of Crete, Chania, Greece; Compcon Spring '93, Feb. 22–26, 1993, pp. 596–604.

Lev Vaitzblitr; "The Design and Implementation of a High–Bandwidth File Server for Continuous Media" Thesis, Master of Science, Massachusetts Institute of Technology, Cambridge, Mass., Sep. 1991, pp. 1–95.

J. Case, M. Fedor, M. Schoffstall, J. Davin, "A Simple Network Management Protocol (SNMP)," May 1990, MIT Laboratory for Computer Science, Cambridge, Mass., pp. 1–35.

Ulyless Black, "TCP/IP and Related Protocols", McGraw–Hill, Inc., New York, N.Y., pp. 304–130.

* cited by examiner

| LOOP INDEX | NEXT STORAGE PORT TO ACCESS | LIST POINTER | STORAGE PORT LIST | ACTIVITY ACCUMULATOR |
|---|---|---|---|---|
| 0 | – | – | – – – – – | – |
| 1 | – | – | – – – – – | – |
| 2 | – | – | – – – – – | – |
| ⋮ | ⋮ | ⋮ | ⋮ | ⋮ |
| 15 | – | – | – – – – – | – |

| LOOP INDEX | HOST INDEX | LIST POINTER | STORAGE PORT LIST | HOST NAME | WWN | S_ID |
|---|---|---|---|---|---|---|
| 0 | 0 | − | − − − − − − | − | − | − |
| 0 | 1 | − | − − − − − − | − | − | − |
| ⋮ | ⋮ | ⋮ | ⋮ | ⋮ | ⋮ | ⋮ |
| 0 | 49 | − | − − − − − − | − | − | − |
| 1 | 0 | − | − − − − − − | − | − | − |
| ⋮ | ⋮ | ⋮ | ⋮ | ⋮ | ⋮ | ⋮ |
| 15 | 49 | − | − − − − − − | − | − | − |

*Fig. 7*

| LOOP INDEX | S_ID MODULUS | ROUTING TABLE INDEX | NEXT STORAGE PORT TO ACCESS | ACTIVITY ACCUMULATOR |
|---|---|---|---|---|
| 0 | 0 | − | − | − |
| 0 | 1 | − | − | − |
| ⋮ | ⋮ | ⋮ | ⋮ | ⋮ |
| 0 | 63 | − | − | − |
| 1 | 0 | − | − | − |
| ⋮ | ⋮ | ⋮ | ⋮ | ⋮ |
| 15 | 63 | − | − | − |

*Fig. 8*

| LOOP INDEX | HOST INDEX | HOST NAME | WWN | S_ID | BITMAP | ESTIMATED LOAD | ACTIVITY ACCUMULATOR |
|---|---|---|---|---|---|---|---|
| 0 | 0 | – | – | – | – | – | – |
| 0 | 1 | – | – | – | – | – | – |
| ⋮ | ⋮ | ⋮ | ⋮ | ⋮ | ⋮ | ⋮ | ⋮ |
| 0 | 49 | – | – | – | – | – | – |
| 1 | 0 | – | – | – | – | – | – |
| ⋮ | ⋮ | ⋮ | ⋮ | ⋮ | ⋮ | ⋮ | ⋮ |
| 15 | 49 | – | – | – | – | – | – |

| LOOP INDEX | HOST INDEX | HOST TABLE INDEX |
|---|---|---|
| 0 | 0 | – |
| 0 | 1 | – |
| ⋮ | ⋮ | ⋮ |
| 0 | 63 | – |
| 1 | 0 | – |
| ⋮ | ⋮ | ⋮ |
| 15 | 63 | – |

DYNAMIC ROUTING FOR PERFORMANCE PARTITIONING IN A DATA PROCESSING NETWORK

BACKGROUND OF THE INVENTION

1. Technical Field

The present invention relates generally to data processing networks, and more particularly to a data processing network in which a multiplicity of host processors are connected to shared resources.

2. Related Art

In many data processing networks, a large number of host processors share resources such as a database or storage subsystem. Typically, each host has a high probability of obtaining immediate access, but immediate access is not guaranteed. The cost of guaranteeing immediate access is usually considered to be much greater than the benefit to the user.

The probability of obtaining immediate access can be increased by using various techniques. A direct but rather costly solution is to provide additional network paths and additional storage resources, such as additional paths to duplicate storage servers for read-only storage volumes. Other techniques, such as dynamic routing and load balancing, attempt to use existing network and storage resources more effectively.

Dynamic routing directs each data access requests along a path that is selected in accordance with the resources that are currently available in order to avoid overload of resources in the network. Load balancing assigns alternative resources to the hosts in order to avoid overload of any one of the alternative resources by receipt of simultaneous access requests from a large number of the hosts. For dynamic routing and load balancing to be particularly effective, however, additional resources are required in order to gather intelligence about the current or expected state of the network, and to control or restrict the path of the data access requests in a fashion that is beneficial. These additional resources tend to introduce cost and complexity into the data network and often reduce performance during usual operating conditions.

SUMMARY OF THE INVENTION

In accordance with one aspect of the invention, there is provided a method of routing resource requests through a switch in a data processing network. The method includes storing, in a memory, routing information defining respective outputs of the switch to which resource requests received at inputs of the switch should be routed. In response to resource requests being received at the inputs of the switch, each resource request received at each input of the switch is routed to an output of the switch by accessing the routing information in the memory to select a respective output of the switch to which the resource request should be routed, and routing the resource request to the selected output of the switch to which the resource request should be routed. The method further includes changing the routing information stored in the memory based on loading characteristics of the resource requests received at the switch inputs in order to balance loading of the resource requests upon the outputs of the switch.

In accordance with another aspect of the invention, there is provided a method of routing storage access requests from host processors through a switch to a data storage subsystem. The switch has inputs coupled to the hosts to receive the storage access requests from the hosts, and the switch has outputs coupled to the data storage subsystem to transmit the storage access requests to the data storage subsystem. The method includes storing, in a memory, routing information defining respective outputs of the switch to which storage access requests received at inputs of the switch should be routed. In response to storage access requests being received at the inputs of the switch, each storage access request received at each input of the switch is routed to an output of the switch by accessing the routing information in the memory to select a respective output of the switch to which the storage access request should be routed, and routing the storage access request to the selected output of the switch to which the storage access request should be routed. The method further includes changing the routing information stored in the memory based on loading characteristics of the storage access requests received at the switch inputs in order to balance loading of the storage access requests upon the outputs of the switch.

In accordance with yet another aspect of the invention, there is provided a switch for routing resource requests in a data network. The switch includes plurality of inputs, a plurality of outputs, and a switch control computer programmed for routing the resource requests from the inputs to the outputs. The switch control computer includes memory storing routing information, and the routing information defines respective outputs of the switch to which resource requests received at the inputs of the switch should be routed. The switch control computer is programmed to respond to receipt of the resource requests at the inputs of the switch by routing each resource request received at each input of the switch to an output of the switch by accessing the routing information in the memory to select a respective output of the switch to which the resource request should be routed, and to route the resource request to the selected output of the switch to which the resource request should be routed. The switch control computer is further programmed to change the routing information stored in the memory based on loading characteristics of the resource requests received at the switch inputs in order to balance loading of the resource requests upon the outputs of the switch.

In accordance with still another aspect of the invention, there is provided a program storage device containing a program for a switch for routing resource requests in a data network according to routing information stored in a memory. The routing information defines respective outputs of the switch to which resource requests received at the inputs of the switch should be routed. The program is executable by the switch for responding to receipt of the resource requests at the inputs of the switch by routing each resource request received at each input of the switch to an output of the switch by accessing the routing information in the memory to select a respective output of the switch to which the resource request should be routed, and to route the resource request to the selected output of the switch to which the resource request should be routed. The program is further executable by the switch to change the routing information stored in the memory based on loading characteristics of the resource requests received at the switch inputs in order to balance loading of the resource requests upon the outputs of the switch.

In accordance with a final aspect of the invention, there is provided a storage network including a cached storage subsystem and a switch. The cached storage subsystem includes a plurality of storage devices, a cache memory linked to the storage devices for filling the cache with data from the storage devices, and a plurality of port adapters providing storage ports for access to the cache memory. The switch has a plurality of inputs for receiving data access requests from a plurality of hosts, and a plurality of outputs linked to the storage ports for selectively routing data access requests from the inputs of the switch to the storage ports. The storage network further includes a memory containing routing information. The routing information defines respective outputs of the switch to which storage access requests received at the inputs of the switch should be routed. The switch is programmed to respond to receipt of the storage access requests at the inputs of the switch by routing each storage access request received at each input of the switch to a selected output of the switch by accessing the routing information in the memory to select an output of the switch to which the each storage access request should be routed, and to route the storage access request to the selected output of the switch to which the storage access request should be routed. The storage network further includes a processor programmed to change the routing information in the memory based on loading characteristics of the storage access requests in order to balance loading of the storage access requests.

BRIEF DESCRIPTION OF THE DRAWINGS

Other objects and advantages of the invention will become apparent upon reading the following detailed description with reference to the accompanying drawings wherein:

FIG. 7 is a routing table of host information used by the switch of FIG. 3 when routing a data packet through the switch;

FIG. 8 is a source identifier modulus table used by the switch of FIG. 3 to decode a source identifier in a data packet from a host in the data processing system of FIG. 3;

FIG. 10 is a table of host information used in the additional digital computer of the data processing system of FIG. 3; and FIG. 11 is a source identifier modulus table used for searching the table of FIG. 10 for an entry having a specified source identifier;

Figure 1:
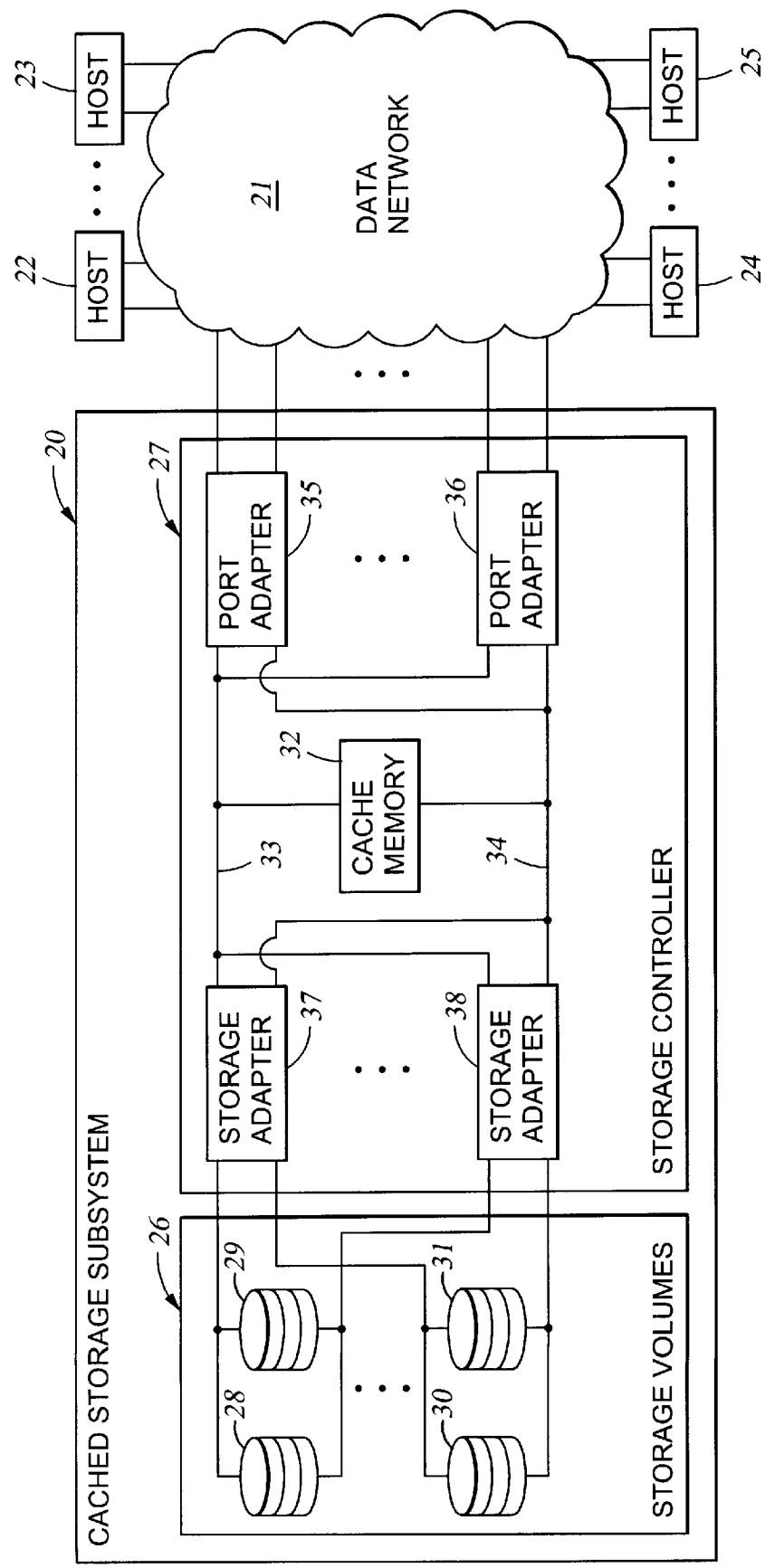
FIG. 1 is a block diagram of a data processing system including a cached storage subsystem linked by a data network to a multiplicity of host processors.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DESCRIPTION OF THE PREFERRED EMBODIMENTS

With reference to FIG. 1 of the drawings, there is shown a cached storage subsystem 20 connected via a data network 21 to a plurality of hosts 22, 23, 24, 25. The cached storage subsystem 20 includes storage volumes 26 and a storage controller 27 for controlling access of the hosts to the storage volumes. The storage volumes are logical units of storage distributed over one more storage devices 28, 29, 30, and 31. The storage devices are magnetic disk drives, optical disk drives, tape drives, solid-state memory devices, or other storage devices capable of providing nonvolatile data storage. Presently the preferred storage devices are magnetic disk drives each having a storage capacity of at least 47 gigabytes.

The storage controller 27 includes a dual port cache memory 32, a plurality of port adapters 35, 36, and a plurality of storage adapters 37, 38. The cache memory 32 is accessed via any one of two back-plane busses 33, 34. Each of the port adapters 35, 36 link the data network 21 to each of the two back-plane busses 33, 34. Each of the storage adapters 37, 38 links a respective set of the storage devices 28, 29, 30, 31 to each of the two back-plane busses 33, 34. For example, the cached storage subsystem includes up to eight storage adapters and up to eight port adapters, and each port adapter provides two independent data ports to the data network.

When a port adapter 35 or 36 receives a storage access request from one of the hosts 22, 23, 24, 25, the port adapter accesses a directory in the cache memory 32 to determine whether or not the data to be accessed resides in the cache memory. If the data to be accessed resides in the cache memory, then the port adapter accesses the data in the cache memory. If the data to be accessed does not reside in the cache memory, then the port adapter forwards a storage access request to the storage adapters 37, 38. One of the storage adapters 37, 38 responds to the storage access request by performing a logical-to-physical translation to determine where the data to be accessed resides on the storage devices, and reads the data from the storage devices and writes the data to the cache memory, for access by the port adapter. The storage adapters 37, 38 also perform a write-back operation to ensure that data written to the cache memory 32 by the port adapters eventually becomes written to the storage volumes 26.

The cache memory 32 ensures that data frequently accessed by the hosts is likely to be found in cache in order to avoid the data access time of the storage devices and in order to minimize loading on the storage adapters and the port adapters. Consolidation of network storage into a large cached storage subsystem provides a benefit that cache resources are consolidated into one large cache, which is more efficient than a number of smaller caches having in total the same cache memory capacity. A large cache is more likely to contain the most recently accessed data than the combined cache memory of the smaller caches.

The storage subsystem 20 is constructed for high data availability so that a single high-capacity storage subsystem is at least as fault-tolerant as a local collection of conventional network storage servers. Fault tolerance is ensured by dual, redundant components and busses in the path from any one of the port adapters 35, 36 to any one of the storage devices 28, 29, 30, and 31. Mirroring or RAID (redundant array of inexpensive disks) techniques ensure that the storage adapters 37, 38 can recover data in the event of failure of any one of the storage devices. In a similar fashion, the data network 21 can be made fault tolerant by ensuring that each of the hosts 22, 23, 24, 25 has independent paths through the data network 21 to each of two of the port adapters 35, 36.

In a preferred form of construction, the cache memory 32 is composed of dynamic RAM memory cards mounted in a card-cage or main-frame, and the port adapters and storage adapters are programmed micro-processor cards that are also mounted in the card-cage or main-frame. Each port adapter 35, 36 has one or more processors for handling the communication protocol of the data network 21 and communicating with the cache memory busses 33, 34. Each storage adapter 37, 38 has one or more processors for handling the communication protocol of the storage devices and for communicating with the cache memory busses 33, 34. For example, the links between the storage adapters 37 and the storage devices 28, 29, 30, and 31 are FWD (fast, wide, differential) SCSI or Fibre Channel fiber-optic loops. The port adapters 35, 36 can be programmed to communicate with the network via any number of communication and/or network protocols, such as Bus and Tag CKD, ESCON, SCSI, Ethernet, FDDI, ATM, DS1, DS3, T3, TCP, UDP, NFS, SNMP, and Fibre Channel. Further details regarding the preferred construction and operation of the cached storage subsystem 20 are disclosed in Yanai et al., U.S. Pat. No. 5,206,939, issued Apr. 27, 1993; Yanai et al. U.S. Pat. No. 5,335,352, issued Aug. 2, 1994; and Yanai et al. U.S. Pat. No. 5,381,539, issued Jan. 10, 1995; all incorporated herein by reference.

Figure 2:
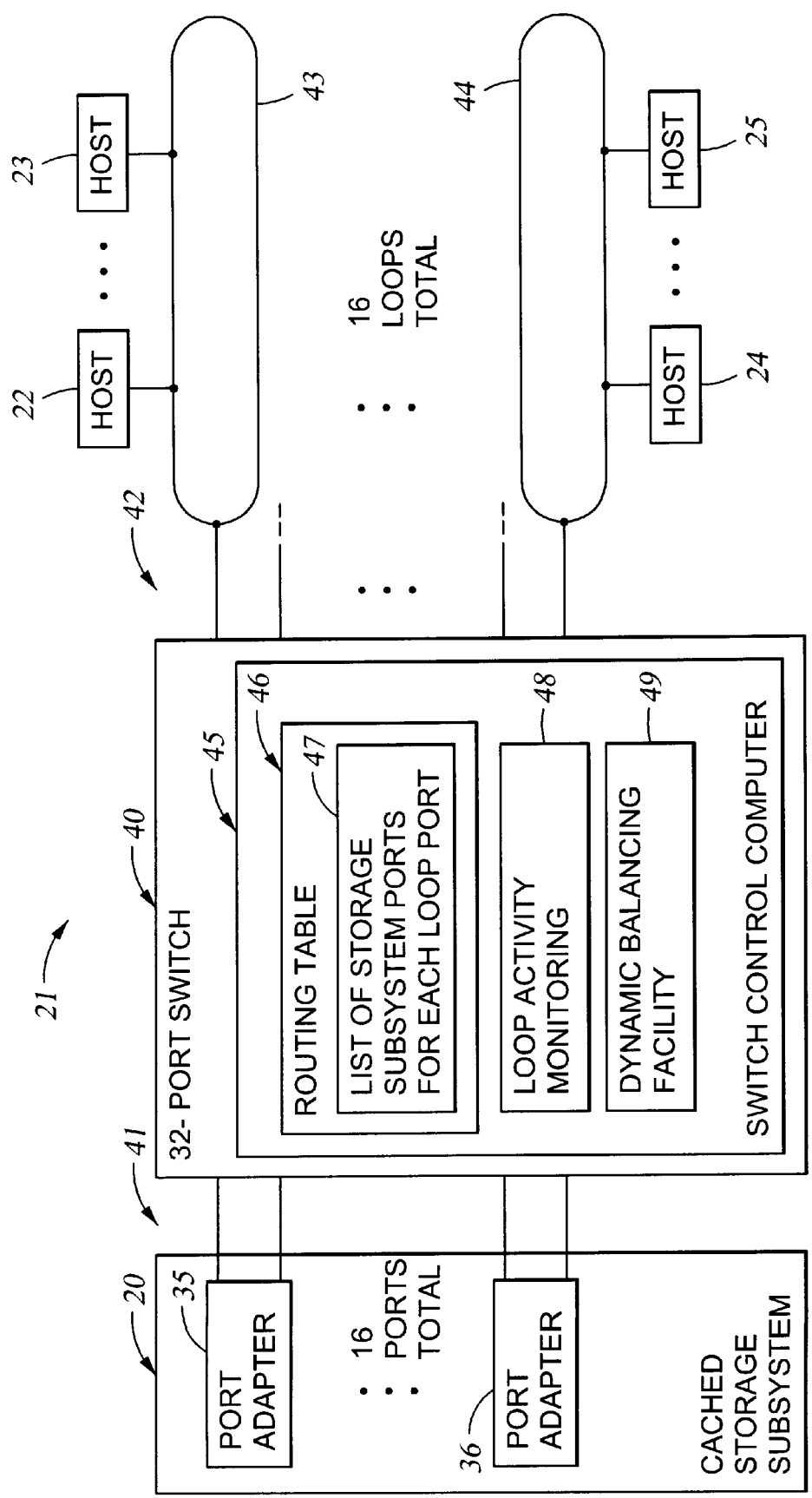
FIG. 2 is a block diagram of the data processing system of FIG. 1 further showing that the data network includes a number of loops and a switch connecting the loops to ports of port adapters of the storage subsystem.

Referring to FIG. 2, the data network is shown having a 32-port switch 40 for simultaneously connecting any one of sixteen storage ports 41 of the port adapters 35, 36 in the storage subsystem to any one of sixteen loop ports 42 of sixteen loops including loops 43 and 44. Each of the sixteen loops 43, 44 has loop ports of up to fifty hosts such as the hosts 22, 23 linked in loop 43 and the hosts 24, 25 linked in the loop 44.

The switch 40 is used in the data network 21 to permit any of the hosts to access any of the storage ports. This is done to reduce the likelihood that storage port overload will prevent a host from obtaining immediate access to storage in the cached storage subsystem. Because the same storage in the storage subsystem can be accessed from any of the storage ports, a host that sends a storage access request to a storage port and receives a busy response from the switch 40 can re-send the storage access request and the request can be routed by the switch to any other storage port.

The likelihood of storage port overload preventing a host from obtaining immediate access to storage in the cached storage subsystem can be reduced still further if not all of the hosts have access to all of the storage ports, so long as this reduction in access is based on balancing of the loading characteristics of the hosts. This is especially true if it is desired to permit some of the hosts to have priority over others, so that under high loading conditions, the higher priority hosts can continue to have immediate access at the expense of the lower priority hosts which are denied immediate access. The introduction of load balancing into a data processing system as shown in FIG. 2, however, typically involves a good deal of complexity, especially if the load balancing is performed dynamically to track highly variable loading characteristics of the hosts.

In the data processing system of FIG. 2, load balancing is performed dynamically by dynamically changing routing characteristics of the switch. Under typical loading conditions, the routing characteristics of the switch are changed in response to measured loading conditions so that no delay need be introduced by the dynamic routing process when the switch receives a data packet from a host. However, if a data packet from a loop is blocked by a busy storage port, the dynamic balancing process may be performed immediately to change the routing characteristics for data packets received from the loop so as to possibly provide a free path when the blocked data packet is retransmitted. By dynamically changing the routing characteristics of the switch, there is no need for the hosts to be burdened by a process of redirecting a data packet to another storage subsystem port when the host receives a port busy signal in response to the data packet. Instead, the host can merely re-transmit the data packet, and the switch 40 can re-route the data packet to another storage subsystem port.

As shown in FIG. 2, the switch 40 has a switch control computer 45 that routes data packets from each of the loop ports 42 to each of the storage subsystem ports 41. When the switch 40 receives a data packet from a loop, the switch control computer 45 accesses a routing table 46 to determine the storage port to which the data packet is routed. The routing table includes a list 47 of storage subsystem ports for each loop, and the switch control computer selects a particular one of the storage ports in the list for the loop from which the data packet is received. For example, the switch control computer selects a storage port from the list in a round-robin fashion, as further described below. Alternatively, the switch could select a storage port from the list in a random or pseudo-random fashion.

In order to adapt the routing of the switch to highly variable loading conditions of data packets from the loop ports 42 upon the storage ports 41, the switch control computer 45 is programmed with a loop activity monitoring facility 48 and a dynamic balancing facility 49. The loop activity monitoring facility 48 measures the frequency of data packets received from and transmitted to each of the loop ports 42 of the switch 40. The dynamic balancing facility adjusts the list of storage subsystem ports for each loop port based on the frequency of data packets received from and transmitted to each of the loop ports and a priority level assigned to each of the loops, in order to dynamically balance the loading of the data packets upon the storage ports.

The switch control computer 45 can be programmed with the routing table 46, loop activity monitoring facility 48, and dynamic balancing facility 49 by loading a new version of the switch control computer program into the switch control computer 45 from a machine readable program storage device such as a conventional floppy disk (not shown).

Figure 3:
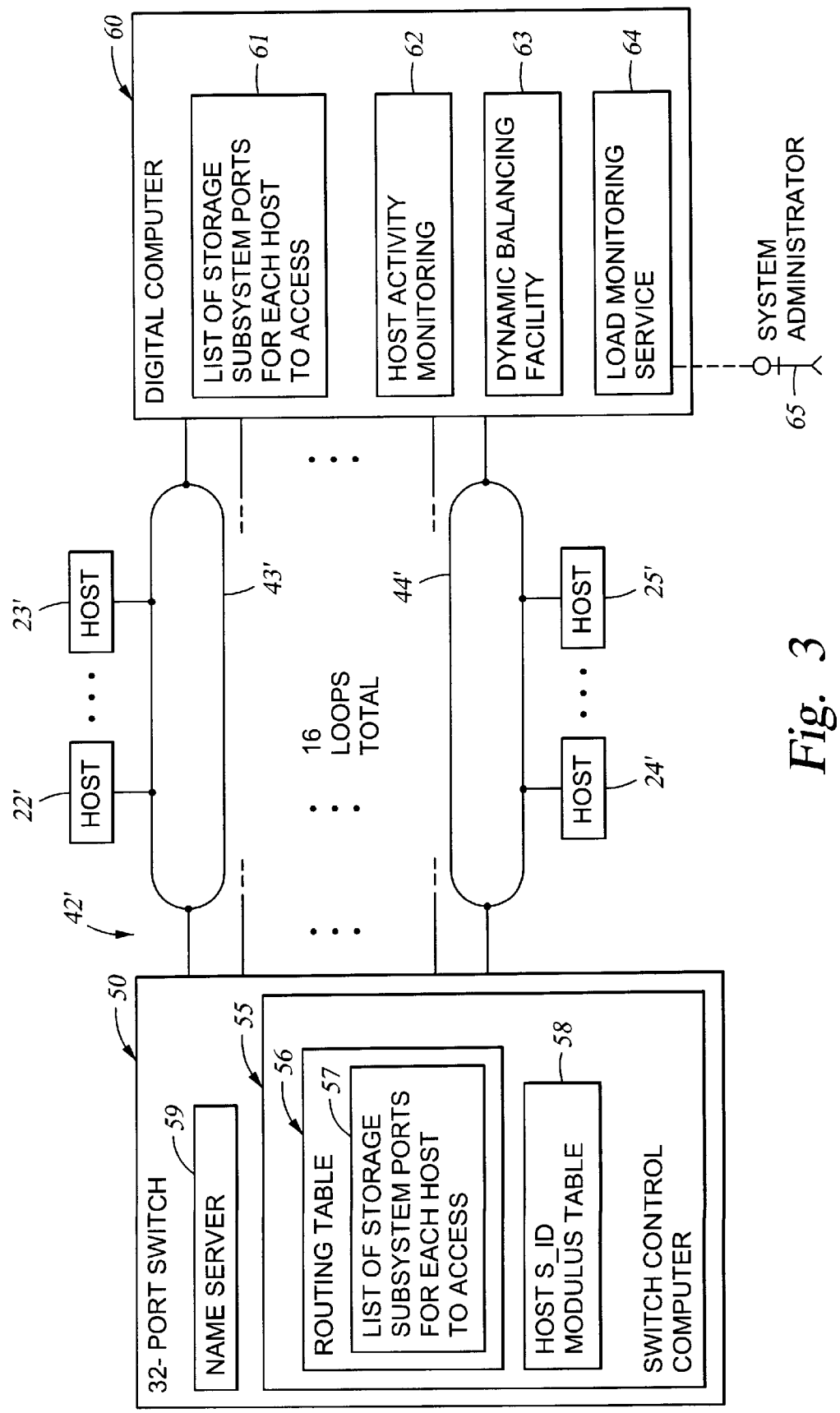
FIG. 3 is a block diagram of an alternative embodiment of the invention that is similar to the data processing system of FIG. 1 but which further includes an additional digital computer for monitoring activity of the hosts.

FIG. 3 is a block diagram of an alternative embodiment of the invention that is similar to the data processing system of FIG. 1 and FIG. 2 but it has an additional digital computer 60 for assisting in the monitoring of activity of the hosts 22'–25' so that the switch control computer 55 of the switch 50 in FIG. 3 can route a data packet from each host to a respective storage subsystem port selected by the switch control computer from a respective subset of storage subsystem ports dynamically assigned to each host. This requires more data processing capability of the switch control computer than selecting a storage subsystem port from a subset of storage subsystem ports assigned to each of the loop ports, especially if it is desired that the handling of a list for each host will not significantly delay the routing of a data packet through the switch. Although the additional data processing capability could be built into the switch control computer, in the example of FIG. 3 the additional data processing capability is provided by the additional digital computer 60.

Components in FIG. 3 which are similar to components in FIG. 2 are denoted with similar but primed reference numerals. The switch control computer 55 in FIG. 3 has a routing table 56 including a list 57 of storage subsystem ports for each host to access. When the switch control computer 55 receives a data packet from a loop, the switch control computer accesses a "host S_ID modulus table" 58 with a modulus computed from a source address (S_ID) decoded from the data packet, in order to obtain an index into the routing table 56. The source address identifies the host from which the data packet originated. The switch control computer then selects, from the list 57 of storage ports indexed in the routing table, a storage port to which the data packet is routed. This will be further described below with reference to FIGS. 7 to 9.

The digital computer 60 monitors the loading of each host on the storage subsystem ports, and periodically, or at least repetitively, computes changes to the routing table 56 in switch control computer 55. The digital computer 60 accesses a conventional name server 59 of the switch 50 in order to obtain information about the hosts that are presently logged in to the switch. In particular, the digital computer 60 transmits a data packet to the switch 50, and the data packet contains a predefined destination address assigned to the name server 59. The name server 59 could be provided by a program executed by the switch control computer 55, or it could be provided by a program executed by another computer or processor associated with the switch 50. When a host logs into the switch, the switch assigns the host the unique source address (S_ID) that the host inserts into the data packets that the host transmits to the switch 50. The digital computer 60 accesses the name server 59 to discover the source address assigned to each of the hosts.

The digital computer 60 also periodically transmits to the switch 50 a new list of storage subsystem ports for each of the hosts to access. This is done, for example, by transmitting one or more application program interface (API) commands that the switch will recognize. Each API command is a data packet that is received on a loop port 42' and contains a predetermined destination address of an API command decoder facility of the switch.

The digital computer 60 is programmed with a host activity monitoring facility 62 that intercepts from the loops 43', 44' data packets transmitted to or from the hosts. The activity monitoring facility 62 measures the frequency of the data packets to or from each of the hosts. The digital computer 60 is also programmed with a dynamic balancing facility 63 that periodically computes a new list of storage subsystem ports for each of the hosts to access, based on the frequencies measured by the host activity monitoring facility 62 and a specified priority level assigned to each of the hosts. The priority level, for example, is specified by a system administrator 65. The dynamic balancing facility 63 maintains in the digital computer 60 a copy of each list 61 of storage subsystem ports for each host to access. Therefore, the digital computer 60 need not read any corresponding list 57 in the switch control computer in order to determine the routing characteristics of the switch 50 for any host. The dynamic balancing facility 63, for example, accesses the list 61 in order to compute the loading on each of the storage subsystem ports from the measured frequencies of data packets received or transmitted from each host.

The digital computer 60 can be a conventional commodity computer having plug-in cards (not shown) for interfacing with the loops 43', 44', and a disk drive (not shown) for loading its programming from a conventional floppy disk (not shown). Because the host activity monitoring facility 62 and the dynamic balancing facility 63 consume a small fraction of the available processing time of the computer 60, the computer can be programmed to provide additional foreground and background tasks. For example, the computer 60 is programmed to provide a load monitoring service 64 that includes a background task of computing and displaying load statistics and diagnostic information to the system administrator 65.

Figures 4, 6:
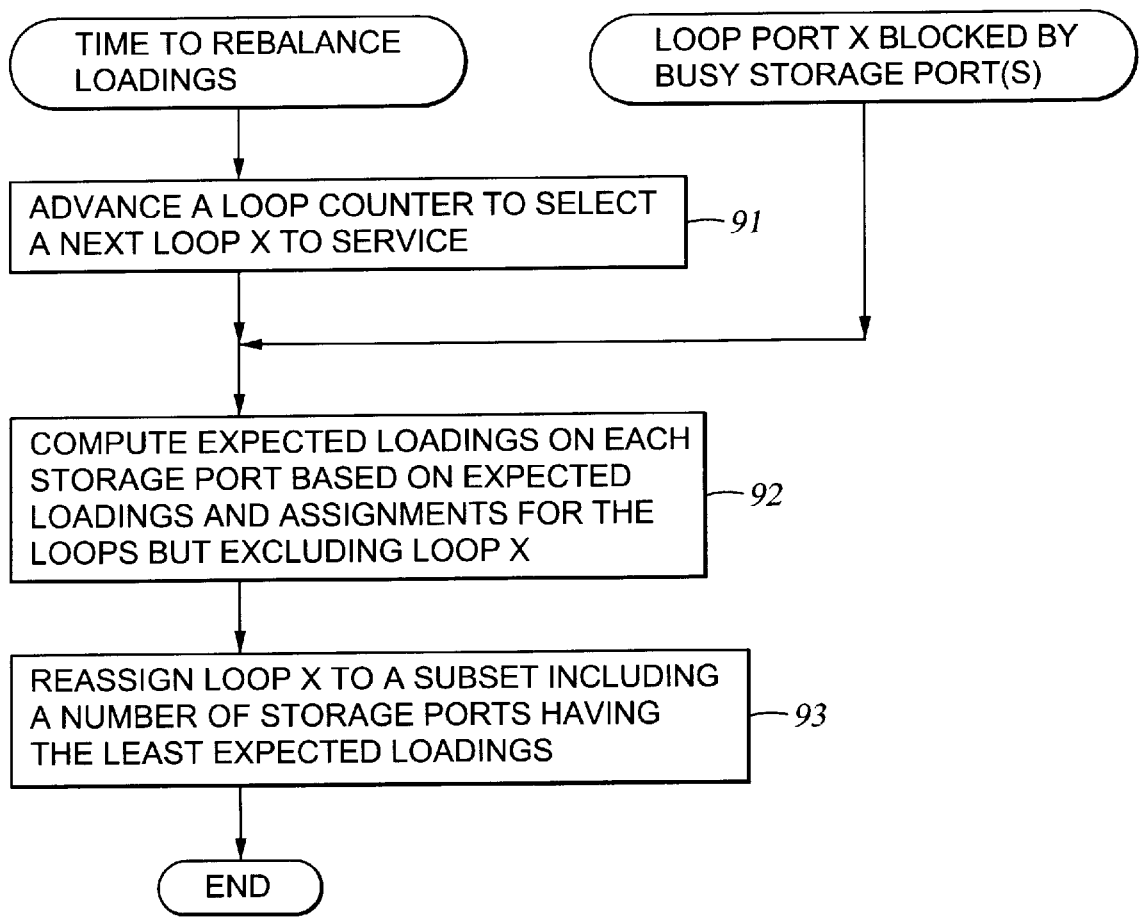
FIG. 4 is a diagram of a routing table of loop information maintained by the switch of FIG. 3.
FIG. 6 is a procedure that is performed periodically or in response to a blocking condition to rebalance loadings from a loop on the ports of the storage subsystem port adapters.

FIG. 4 shows a format for the routing table 46 used in the switch control computer 45 of FIG. 2. The routing table 46 of FIG. 4 includes an entry for each of the sixteen loop ports, and therefore an entry in the routing table can be selected by a loop index ranging from zero to fifteen. Each entry of the routing table 46 includes an identifier of a next storage port for the loop to access, a list pointer, a storage port list, and an activity accumulator.

Figure 5:
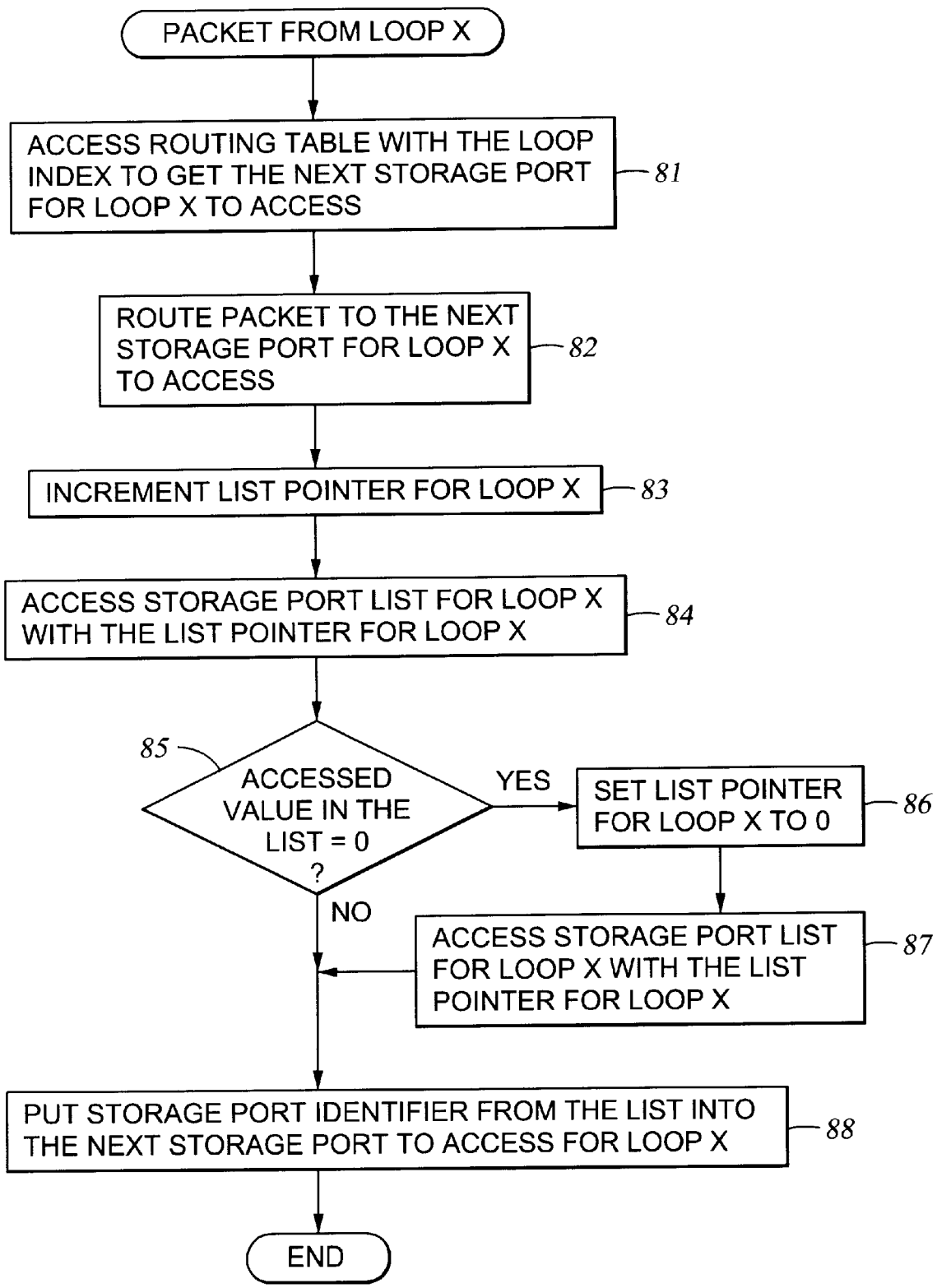
FIG. 5 is a flowchart of a procedure used by the switch of FIG. 2 when routing a data packet through the switch.

With reference to FIG. 5, there is shown a flowchart showing how the switch control computer 45 in FIG. 2 is programmed to use the routing table 46 of FIG. 4 in response to receipt of a data packet from a loop port X. In a first step 81, the switch control computer accesses the routing table 46 with the loop index of the loop port X to read from the indexed table entry the identifier of the next storage port for the loop port X to access. Then in step 82 the switch control computer routes the data packet from the loop port X to the storage port identified by the identifier of the next storage port for the loop port X to access. The routing of step 82 may involve the conventional operations of checking whether or not the next storage port for the loop port X to access is busy, and if so, returning a storage port busy signal to the host originating the data packet, and if not, transmitting the data packet to the next storage port for loop port X to access. Alternatively, in the routing step 82, the switch control computer may return a storage port busy signal to the host originating the data packet only after checking all of the storage ports on the storage port list for the loop port X and finding that all of these storage ports are busy, as will be further described below with respect to a pseudo code listing. The following steps 83 to 88 determine the next storage port for loop X to access for the next data packet to be received from loop X. Because steps 83 to 88 can be completed before the next data packet is received from loop X, steps 83 to 88 need not introduce any delay in the routing of a data packet.

In step 83, the switch control computer 45 increments the list pointer for loop port X in the indexed entry of the routing table. Then in step 84, the switch control computer accesses the storage port list for the loop port X in the indexed entry of the routing table 46, and in particular accesses the entry indicated by the list pointer for the loop port X. The storage port list in each entry of the routing table, for example, includes seventeen bytes. The list begins with a storage port identifier in the first byte, and may include from zero to fifteen following storage port identifiers, in contiguous following bytes, and ends with a predetermined end-of-list delimiter value. For example, the storage port identifiers range from one to sixteen, and the end-of-list delimiter value is zero. In step 85, the accessed value in the list at the location pointed to by the list pointer is compared to the end-of-list delimiter value of zero. If the accessed value in the list is zero, then the list pointer is pointing to the end-of-list delimiter. Therefore, execution branches in step 86 to set the list pointer for the loop port X to zero, and in step 87 the storage port list for the loop X is again accessed at the location pointed to by the list pointer. Finally, in step 88, the storage port identifier accessed at the location pointed to by the list pointer is read from the list and written to the location in the indexed entry of the routing table for the next storage port to access for loop X. If in step 85 the accessed value in the list is not zero, then the accessed value is a storage port identifier, and execution therefore continues from step 85 directly to step 88.

As noted above with respect to step 82, it is possible to program step 82 so that the switch control computer may return a storage port busy signal to the host originating the data packet only after checking all of the storage ports on the storage port list for the loop port X and finding that all of these storage ports are busy. For example, this can be done in step 82 by the following pseudo-code, which selects, on a round-robin basis, a non-busy storage port for the loop port X to access from the list or subset of storage ports that loop X should access, or else returns a busy signal if all of the storage ports are busy in the list or subset of storage ports that loop X should access.

Step 82: If the next storage port for loop X to access is not busy, route the data packet to the next storage port for loop X to access, and go to step 83; otherwise do the following:

(a) Save the value of the list pointer for loop X in a variable OLDPTR.

(b) Increment the list pointer for loop X.

(c) Access the storage port list for loop X with the list pointer for loop X to find the next storage port for loop X to access.

(d) If the accessed value in the storage port list for loop X is equal to zero, then set the list pointer for loop X to zero and again access the storage port list for loop X to find the next storage port for loop X to access;

(e) Compare the list pointer for loop X to the value of OLDPTR, and if they are equal, then return a storage port busy signal to the host and end; otherwise, continue to step (f) below.

(f) If the next storage port for loop X to access is not busy, then route the data packet to the next storage port for loop X to access and go to step 85; otherwise, go to step (b) above.

It should be apparent that before the switch control computer program routine of FIG. 5 is used to route data packets from the loop ports to the storage ports, the routing table should be set to the format of FIG. 4. Any valid set of initial values could be used in the routing table because the hosts log into the switch in sequence after the switch is installed so that the switch control computer can adapt to the loading conditions as more and more hosts begin to send data packets to the loop ports for routing to the storage ports. For example, each of the initial lists could simply include a random or pseudo-random sequence of all of the storage port identifiers, and an initial value for the loading of each loop port could be set to the same predetermined initial value. Alternatively, in a data processing system where the loop ports are expected to have certain loadings, the initial lists can be determined before the switch is installed in order to balance the expected loadings. For example, the following procedure could be used to determine the initial subset of storage ports to assign to each loop port based on assigned priorities and expected loadings, and in this case the storage port identifiers for the storage ports in each subset for each loop port as determined by the following procedure would be inserted in a random or pseudo-random sequence in the routing table list for the loop port.

```
** COMMENTS: **
** NPORTS is the number of storage ports. **
** Storage Ports 1 and 2 are on a first port adapter, **
** Storage Ports 3 and 4 are on a second port adapter, etc.
**
** NLOOPS is the number of loop ports. **
** PORTLOAD is the estimated load allocated to each
storage port.
** BITMAP is a bitmap array including for each loop ports
a string of bits indicating **
** which storage ports are allocated to each loop port. **
** LOOPLOAD is the load estimated for each loop port. **
** PRIORITY is the number of storage ports to be allocated
to each loop port. **
FOR I=1 TO NPORT
   PORTLOAD(I)=0
   FOR J=1 TO NLOOPS
      CLEAR BITMAP(J,I)
   END
END
FOR J=1 TO NLOOPS
   FOR K=1 TO PRIORITY(J)
      I=MIN(PORTLOAD, BITMAP, J, NPORTS, K)
      SET BITMAP(J,I)
      PORTLOAD(I)=PORTLOAD(I)+LOOPLOAD(J)/
         PRIORITY(J)
   END
END
** The MIN function finds one storage port to assign to
Loop no. J. **
FUNCTION MIN(PORTLOAD, BITMAP, J, NPORTS, K)
** MAXVALUE is a constant that has the maximum possible value. **
** ACC is a temporary variable for finding a minimum
storage port loading value **
** for storage ports that are not yet assigned and that might
be assigned **
** to loop no. J. **
   ACC=MAXVALUE
** ODD is a flag for indicating whether the storage port
index I is odd or even. **
   SET ODD TO FALSE
   FOR I=1 TO NPORTS
      ODD=NOT ODD
** The next line of code prevents a port from being allocated
twice to a host. **
   IF BITMAP(J,I) THEN NEXT I
** The next three lines of code prevent a loop port **
** from being assigned to both storage ports of the same port
**
** adapter so far as possible; i.e., so long as the priority is
**
** less than or equal to half the number of storage ports. **
   HALF=NPORTS/2
   IF K<=HALF AND ODD AND BITMAP(J,I+1) THEN
      NEXT I
   IF K<=HALF AND NOT ODD AND BITMAP(J,I-1)
      THEN NEXT I
```

IF ACC>PORTLOAD(I) THEN (ACC=PORTLOAD(I), MIN=I)
END

FIG. 6 is a flowchart of the procedure performed by the dynamic balancing facility 49 of the switch control computer 45 in FIG. 2. The procedure in FIG. 2 is performed as a background process on a repetitive or periodic basis, and also can be performed in response to a particular loop X being blocked by the storage port or ports currently allocated to it being busy. When the procedure of FIG. 2 is performed on a repetitive basis, a loop counter is advanced in step 91 to select a next loop port X in sequence. The sequence could be a fixed, random, or pseudo-random sequence of the loop ports.

Step 92 of FIG. 6 is performed after a particular loop port X has been selected in step 91 or in response to blockage of a particular loop port X. In step 92, the expected loadings on each storage port are computed based on expected loadings of the loop ports and current storage port assignments to each of the loop ports except the loadings and assignments for loop port X are excluded. For example, the expected loading on each storage port is computed as the summation of the expected loading of each loop port that is currently permitted to access the storage port excluding loop port X divided by the respective number of storage ports that said each loop port is permitted to access. Finally in step 93, the loop port X is reassigned to a subset of storage ports subset including its assigned priority number of storage ports. The storage ports in the subset are selected to be the available storage ports having the least expected loadings as computed in the previous step 92. The loop port X is reassigned to this selected subset, for example, by inserting the storage port identifiers for the storage ports in the subset in a random or pseudo-random sequence into the routing table list for the loop port X.

Steps 91 and 92 of FIG. 6 could use the following code similar to the code listed above, where LOOPX is the index of loop port X:

```
FOR I=1 TO NPORTS
   PORTLOAD(I)=0
   FOR J=1 TO NLOOPS
      IF J=LOOPX THEN NEXT J
      IF BITMAP(J,I) THEN PORTLOAD(I)=
         PORTLOAD(I)+LOOPLOAD(J)/PRIORITY(J)
   : END
   END
J=LOOPX
FOR I=1 TO NPORTS
   CLEAR BITMAP(J,I)
   END
FOR K=1 TO PRIORITY(J)
   I=MIN(PORTLOAD, BITMAP, J, NPORTS, K)
   SET BITMAP(J,I)
   PORTLOAD(I)=PORTLOAD(I)+LOOPLOAD(J)/
      PRIORITY(J)
   END
```

In the system data processing system of FIG. 2, the switch 40 routes data packets from each loop port to a subset of storage ports dynamically assigned to each loop port in order to balance loading of the data packets from the loop ports on the storage ports. This is done to minimize blocking of data packets due to busy storage ports at least for loop ports having relatively high priority. By using some additional data processing capability of the switch control computer 45, it is possible to further reduce the blocking of data packets, at least for data packets originating from hosts having relatively high priority. In particular, a respective subset of the storage ports is dynamically assigned to each host, based on the priority of the host and the expected loadings of each host on the storage ports. An example of a data processing system using this method was introduced in FIG. 3. In this example, the switch control computer 55 is programmed with the routing table 56 of FIG. 7 and a host S_ID modulus table 58 of FIG. 8.

With reference to FIG. 7, the routing table 56 includes an entry of information for each host. Each entry in the table 56 is indexed by the combination of a respective loop index ranging from 0 to 15 for the example of 16 loop ports, and a respective host index ranging from 0 to 49 for the example of a maximum of 50 hosts on each loop. (The digital computer 60 in FIG. 3 would count as one host on each of the loops.) The routing table 56 is indexed by the combination of a loop index ranging from 0 to 15 for the example of sixteen loop ports, and a host index ranging from 0 to 49 for the example of a maximum of 50 hosts per loop. For each value of loop index, the host index ranges from 0 to 49 for a set of contiguous table entries, so that the routing table 56 includes a routing sub-table for each loop, and the routing sub-table includes information about the hosts linked to the loop. The same host index may index different entries for hosts on different loops.

Each entry in the routing table 56 includes a list pointer for the host, a storage port list 57 for the host, a host name, a world-wide name for the host, and a source address (S_ID) for the host. The list pointer and storage port list are similar to the list pointer and storage port list used in the routing table 46 of FIG. 4. The host name, the WWN, and the S_ID are each a kind of identification for the host.

Preferably the WWN and S_ID are identifications in compliance with the Fibre Channel standards currently being developed by the American National Standards Institute (ANSI). In a Fibre Channel network, each port has a 64-bit port identifier called a "World Wide Name" (WWN). To ensure that the WWN is unique, for example, it may include a unique identifier of the manufacturer of the device including the port (e.g., an Organizationally Unique Identifier as registered with the IEEE in New York, N.Y.), and the manufacturer's serial number of the device. The WWN is too long, however, to be used for source and destination addresses of request and responses transmitted over the network. Therefore, the Fibre Channel standards specify that each port is assigned a temporary address that is unique to the configuration of the network at any given time, but not necessarily unique to each port for all time. Information is transmitted over a Fibre Channel network in fixed-length packets called "Frames", and each Frame includes a source address (S_ID) which is the temporary address of the source of the frame, and a destination address (D_ID) which is the temporary address of the destination of the frame.

When a Fibre Channel network has a switch such as the switch 50, the network is provided with a directory service called a "name server" that manages the assignment and reporting of the temporary addresses for the ports connected by the network. For example, in the data processing system of FIG. 3, the switch 50 includes such a name server 59. The name server 59 has a predefined address on the network. A port can "log in" to the name server to obtain the temporary address assigned to the port, and the port can also interrogate the name server about other ports that are connected in the network.

In the routing table 56, the host name is included for convenience of the system administrator 65 since the WWN is merely a long string of numbers that happens to be programmed into port circuitry of the host. The host name, for example, is a descriptive name that could indicate a unique physical location for the host or a unique name of a user assigned to the host. If the port circuitry of a host were changed, the WWN programmed into that circuitry would also change, but the host name could remain the same. In the routing table 56, the S_ID is the unique network address assigned to the host by the name server 59.

In order for the switch control computer 55 to route a data packet from a host to a storage port in the subset of storage ports assigned to the host, the switch control computer must decode the S_ID in the data packet to identify the host. The host S_ID modulus table 58 of FIG. 8 is used in the decoding process. The name server 59 assigns a block of contiguous S_ID values to each loop, so that the last eight bits of the S_ID value are unique at any given time for each of the ports on the loop. The last eight bits of the S_ID will be referred to as the S_ID modulus. Each entry in the host S_ID modulus table 58 is indexed by the combination of a loop index ranging from 0 to 15 for the example of sixteen loop ports, and a S_ID modulus ranging from 0 to 63 for the example of a maximum of 50 hosts per loop. For each value of loop index, the S_ID modulus ranges from 0 to 49 for a set of contiguous table entries, so that the host S_ID modulus table 58 includes a routing host S_ID modulus sub-table for each loop. The same S_ID modulus may index different entries for hosts on different loops.

Each entry of the host S_ID modulus table includes a routing table index to a corresponding entry in the routing table 56 of FIG. 7, the next storage port for the host to access, and an activity accumulator. The next storage port for the host to access and the activity accumulator are similar to the next storage port to access and the activity accumulator in the routing table 46 of FIG. 4.

Figure 9:
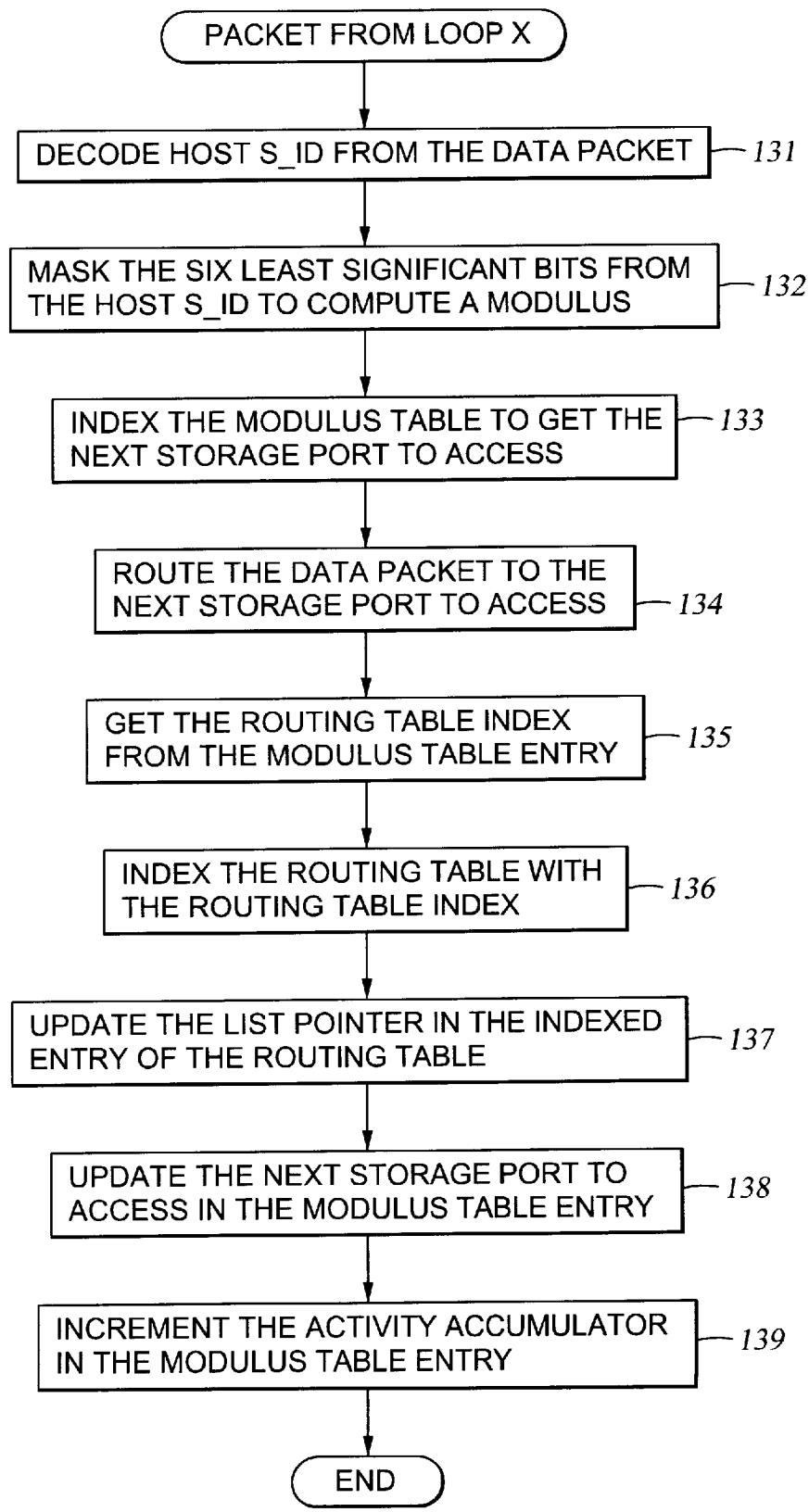
FIG. 9 is a flowchart of a procedure used by the switch of FIG. 3 for routing a data packet received from a loop in the data processing system of FIG. 3.

With reference to FIG. 9, there is shown a flowchart of a program routine executed by the switch control computer 55 when using the routing table 56 and the host S_ID modulus table 58 to route a data packet received from a loop port X. In a first step 131, the switch control computer decodes the source address (S_ID) from the data packet. In step 132, the switch control computer masks off the six least significant bits from the host S_ID to compute an S_ID modulus. Then in step 133 the switch control computer indexes the host S_ID modulus table with a loop index for the loop X port and the S_ID modulus computed in step 132 in order to obtain an indication of the next storage port to access for the host. Then in step 134 the switch control computer routes the data packet to the next storage port to access.

In order to update the indication of the next storage port to access for the host, in step 135 the switch control computer reads the routing table index from the modulus table entry. In step 136, the switch control computer indexes the routing table with the routing table index. In step 137, the switch control computer updates the list pointer in the indexed entry of the routing table. Step 137 is similar to steps 83 to 87 of FIG. 5. Then in step 138 the switch control computer updates the indication of the next storage port to access in indexed entry of the host S_ID modulus table.

Finally, in step 139, the switch control computer increments the activity accumulator of the modulus table entry, and the routine of FIG. 9 is finished.

Step 139 of FIG. 9 accumulates occurrences of data packets being transmitted by each of the hosts. The accumulators in the host S_ID modulus table could also accumulate occurrences of data packets being transmitted to each of the host. For example, whenever the switch 50 transmits a data packet to any one of the loops, the switch control computer 55 computes a S_ID modulus by masking off the least significant six bits from the destination address of the data packet, indexes the host S_ID modulus table with the S_ID modulus and a loop index for the loop to which the data packet was transmitted, and increments the activity accumulator in the indexed entry of the host S_ID modulus table.

The switch control computer 55 could be programmed with a dynamic balancing routine similar to the dynamic balancing routing of FIG. 6. Such a dynamic balancing routine would function as described above with reference to FIG. 6, provided that every reference to "loop X" or "loop port" would be changed to "host X" or "host," since the dynamic balancing routine for the switch control computer 55 would assign a respective subset of storage ports to each host based on the loading of each host and the priority of each host. As shown in FIG. 3, however, the digital computer 60 is programmed with such a dynamic balancing routine 63. The dynamic balancing routine 63 uses a host information table 150 shown in FIG. 10.

With reference to FIG. 10, the host information table 150 is similar to the routing table 56 in the switch control computer 55. The digital computer 60, for example, registers with the name server 59 to receive a report of any "state change" upon assignment of the host S_IDs or detection of any change in the WWN of a host. Therefore, the host name, WWN, and S_ID information in the host information table 150 should be a copy of host name, WWN, and S_ID information in the routing table 56 in the switch control computer 55. The host information table 150 maintains a list 61 of storage subsystem ports for each host to access. The list 61 is in the form of a bitmap for each entry of the host information table 150, and each bitmap indicates the storage subsystem ports included in the storage port list 57 in a corresponding entry in the routing table 56 in the switch control computer 55. Each bitmap, for the case of sixteen storage subsystem ports, is a string of sixteen contiguous bits (i.e., two contiguous bites) when each respective bit is set or not set to indicate whether or not each storage port is included in the subset assigned to the host. Each entry of the host information table further includes an activity accumulator for each host, and an estimated load for each host. The host activity monitoring facility 62 increments the activity accumulator for each host whenever the host receives or transmits a data packet. On a timed interrupt basis, the content of the activity accumulator in each entry is periodically copied to the estimated load in the entry, and the activity accumulator is reset to zero.

With reference to FIG. 11, there is shown a S_ID modulus table 160 used by the host activity monitoring facility 62. The S_ID modulus table 160 includes, for each possible loop index and S_ID modulus, an entry including a host table index that indexes the host table index if the S_ID modulus is a modulus of a S_ID value in the host information table, or else a zero or null value.

Figure 12:
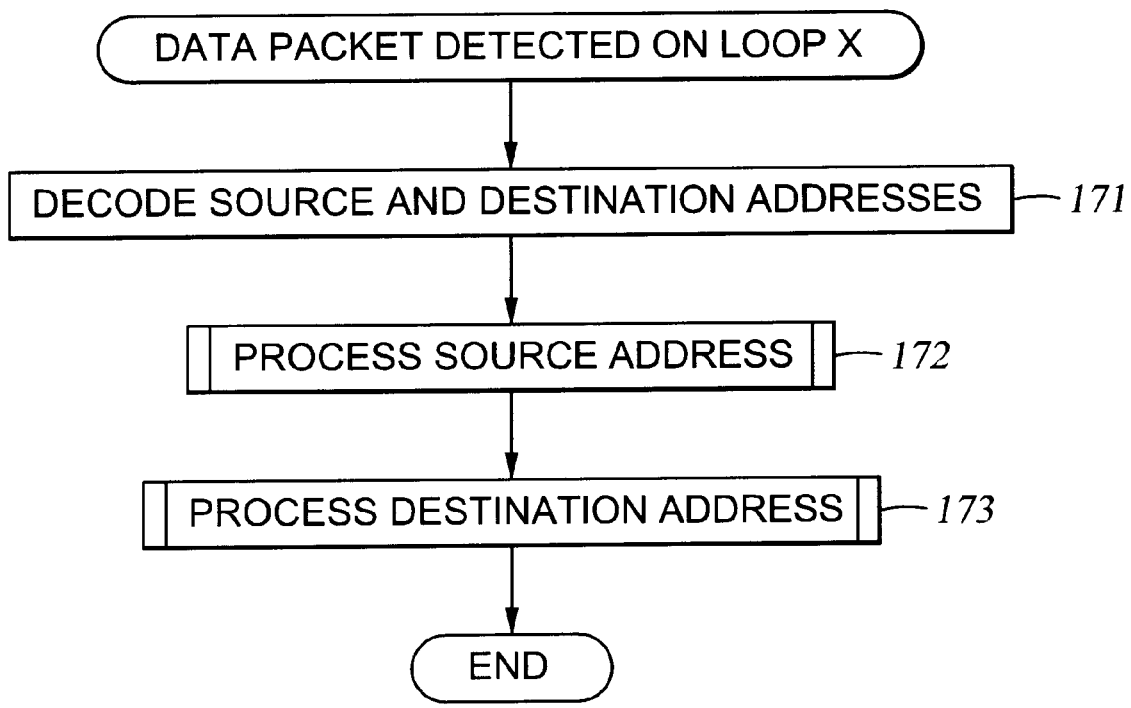
FIG. 12 is a flowchart of a main routine of a host activity monitoring facility in the additional digital computer in the data processing system of FIG. 3.

FIG. 12 shows a flowchart of a main routine of the host activity monitoring facility 62. This main routine is invoked when the digital computer 60 detects a data packet on a loop. In a first step 171, the digital computer 60 decodes the source address and destination address from the data packet. Next, in step 172, the digital computer 60 calls a subroutine of FIG. 13 for processing the source address. Finally, in step 173, the digital computer 60 calls the subroutine of FIG. 13 for processing the destination address, and the main routine of FIG. 12 is finished.

Figure 13:
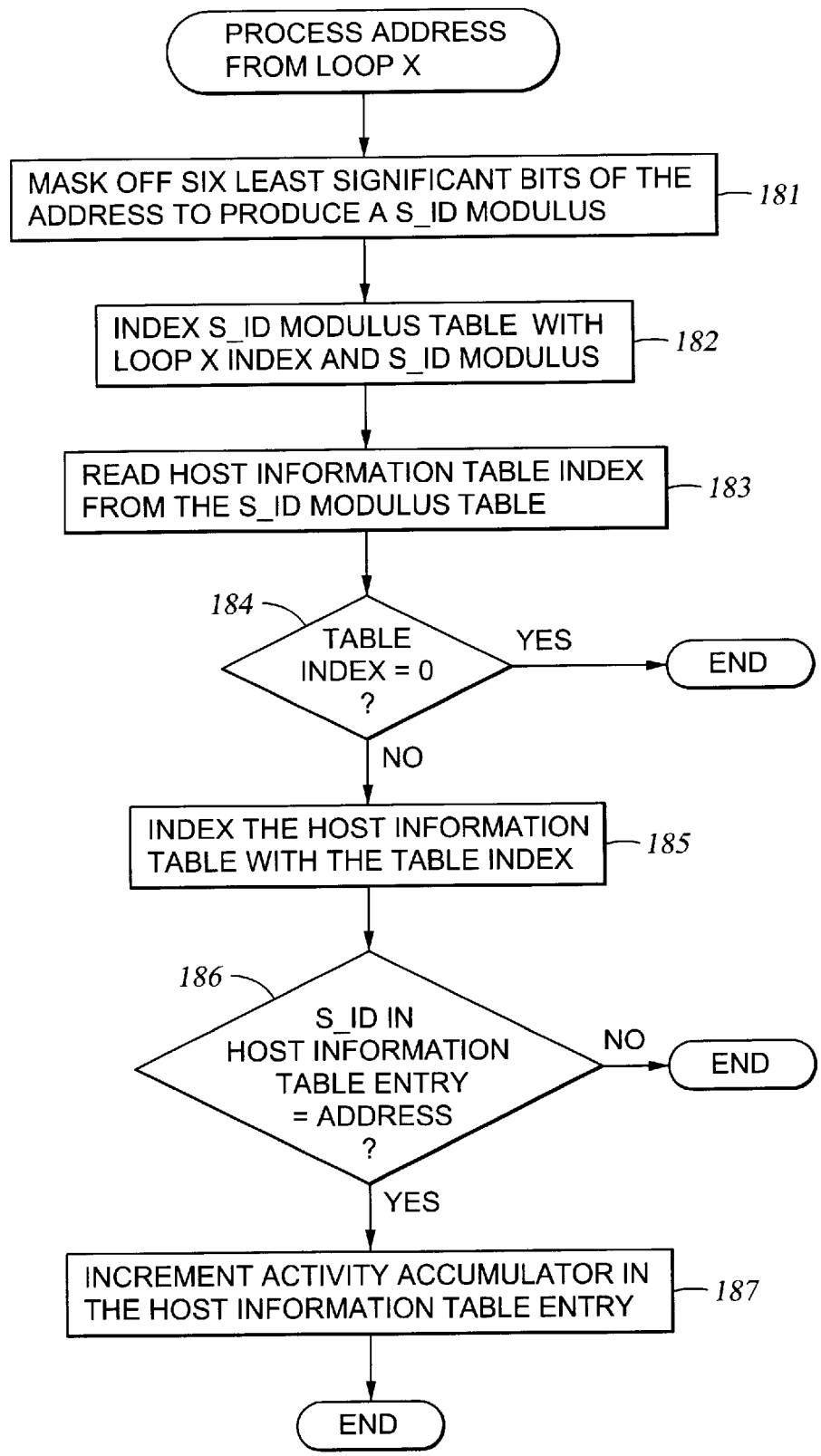
FIG. 13 is a subroutine called by the main routine of FIG. 12.

As shown in FIG. 13, in a first step 181 of the subroutine, the digital computer 60 masks off the six least significant bits of the address to produce an S_ID modulus that is the least significant six bits of the address. In step 182, the digital computer 60 indexes the S_ID modulus table (160 of FIG. 11) with the loop index for the loop from which the data packet containing the address was obtained, and with the S_ID modulus computed in the prior step 181. In step 183, the digital computer 60 reads the host information table index from the indexed entry of the S_ID modulus table. In step 184, the digital computer 60 compares the table index to a zero or null value, and if the table index has a zero or null value, then the subroutine is finished. Otherwise, execution continues to step 185. In step 185, the digital computer 60 indexes the host information table (150 in FIG. 10) with the table index. In step 186, the digital computer compares the S_ID value in the indexed entry of the host information table with the respective source or destination address decoded from the data packet. If they do not match, then the subroutine is finished, otherwise, execution continues to step 187. In step 187, the digital computer 60 increments the activity accumulator in the indexed entry of the host information table, and the subroutine of FIG. 13 is finished.

The dynamic balancing facility 63 can have a program similar to the dynamic balancing facility described above with respect to FIG. 6, except "loop" and "loop port" should be replaced with "host" wherever "loop" and "loop port" appear in the flowchart. Initially, the respective subset of storage ports assigned to each host can be determined based on assigned priorities and rough estimates of the host loadings. For example, the following program could be used to determine the initial values for the bitmaps in the host information table of FIG. 10 and the initial values in the storage port lists of the routing table 46 of FIG. 4:

```
** COMMENTS: **
** NPORTS is the number of storage ports **
** Storage Ports 1 and 2 are on a first port adapter, **
** Storage Ports 3 and 4 are on a second port adapter, etc.
**
** NHOSTS is the number of hosts **
** PORTLOAD is the estimated load allocated to each port
** BITMAP is a bitmap array including for each host a
   string of bits indicating **
** which storage ports are allocated to each host **
** HOSTLOAD is the load estimated for each host**
** PRIORITY is the number of storage ports to be allocated
   to each host. **
FOR I=1 TO NPORT
  PORTLOAD(I)=0
  FOR J=1 TO NHOSTS
    CLEAR BITMAP(J,I)
  END
END
FOR J=1 TO NHOST
  FOR K=1 TO PRIORITY(J)
    I=MIN(PORTLOAD, BITMAP, J, NPORTS, K)
    SET BITMAP(J,I)
    PORTLOAD(I)=PORTLOAD(I)+HOSTLOAD(J)/
      PRIORITY(J)
  END
END
** The MIN function finds one storage port to assign to Host
no. J. **
FUNCTION MIN(PORTLOAD, BITMAP, J, NPORTS, K)
** MAXVALUE is a constant that has the maximum possible value. **
** ACC is a temporary variable for finding a minimum
storage port loading value **
** for storage ports that are not yet assigned and that might
be assigned **
** to Host no. J **
  ACC=MAXVALUE
** ODD is a flag for indicating whether the storage port
index I is odd or even. **
  SET ODD TO FALSE
  FOR I=1 TO NPORTS
    ODD=NOT ODD
** The next line of code prevents a port from being allocated
twice to a host. **
    IF BITMAP(J,I) THEN NEXT I
** The next three lines of code prevent a host processor **
** from being assigned to both ports of the same port **
** adapter so far as possible; i.e., so long as the priority is
**
** less than or equal to half the number of ports. **
    HALF=NPORTS/2
    IF K<=HALF AND ODD AND BITMAP(J,I+1) THEN
      NEXT I
    IF K<=HALF AND NOT ODD AND BITMAP(J,I-1)
      THEN NEXT I
    IF ACC>PORTLOAD(I) THEN (ACC=PORTLOAD(I),
      MIN=I)
END
```

Once the host activity monitoring facility 62 measures the actual loading of a host, then the dynamic balancing facility can update the subset of storage ports assigned to the host (having an identifier referred to as HOSTX in the following program listing) either repetitively or in response to blockage of data packets from the host due to the storage ports assigned to the host being busy:

```
FOR I=1 TO NPORTS
  PORTLOAD(I)=0
  FOR J=1 TO NHOSTS
    IF J=HOSTX THEN NEXT J
    IF BITMAP(J,I) THEN PORTLOAD(I)=
      PORTLOAD(I)+HOSTLOAD(J)/PRIORITY(J)
  : END
  END
J=HOSTX
FOR I=1 TO NPORTS
  CLEAR BITMAP(J,I)
END
FOR K=1 TO PRIORITY(J)
  I=MIN(PORTLOAD, BITMAP, J, NPORTS, K)
  SET BITMAP(J,I)
  PORTLOAD(I)=PORTLOAD(I)+HOSTLOAD(J)/
    PRIORITY(J)
END
```

While a specific example has been described having a data network including one switch and a multiplicity of loops, it should be apparent to a person of ordinary skill that the data network could have a more complex topology. Although loops are used in FIG. 2 and FIG. 3 for connecting a plurality of hosts to a respective 32-port switch 40 or 50, it should be readily apparent that one or more of these loops could be replaced by a switch. In general, for a given number of ports on a loop or switch, a loop is less expensive and is preferred so long as the loop can handle the bandwidth requirements of possible concurrent access by the hosts on the loop. For example, there may be certain bandwidth intensive applications, such as interactive video applications, where it would be preferable to use a switch in lieu of a loop. If one host has much more demanding bandwidth requirements than the other hosts, it may be desirable to connect the one host directly, via a private link, to a respective one of the ports of the 32-port switch. Under such circumstances, in order to provide additional ports for such direct connections, it may be desirable to use a switch having more than 32 ports in lieu of the 32-port switch in FIG. 2 or FIG. 3. Therefore, the present invention is applicable to a wide variety of network topologies that could be used to satisfy diverse storage requirements of different kinds of host computers and different kinds of host applications.

The data network could also have additional switches in a hierarchical arrangement so that a storage access request from a host could be routed by an additional switch to any one of a plurality of ports on the switch 40 in FIG. 2 or on the switch 50 in FIG. 3. For example, a group of a plurality of loops 43, 44 in FIG. 2 or a group of a plurality of loops 43', 44' in FIG. 3 could replaced by one additional switch. If it is possible for any one of the switches in the data network to route a data packet received on one of its inputs to more than one of its outputs to eventually reach a desired destination, or to reach an acceptable alternative destination, then that one switch can be programmed to perform the dynamic routing methods described above with reference to the switch 40 in FIG. 2 and the switch 50 in FIG. 3.

What is claimed is:

1. A method of routing resource requests through a switch in a data processing network, said method comprising:
   a) storing, in a memory, routing information defining respective outputs of the switch to which resource requests received at inputs of the switch should be routed;
   b) in response to resource requests being received at the inputs of the switch, routing each resource request received at each input of the switch to an output of the switch by accessing the routing information in the memory to select a respective output of the switch to which said each resource request should be routed, and routing said each resource request to the selected output of the switch to which said each resource request should be routed; and
   c) changing the routing information stored in the memory based on loading characteristics of the resource requests received at the switch inputs in order to balance loading of the resource requests upon the outputs of the switch.

2. The method as claimed in claim 1, wherein the routing information stored in the memory defines for each input of the switch a respective subset of outputs of the switch to which resource requests received at said each input of the switch should be routed, and the respective output of the switch to which said each resource request should be routed is selected by selecting one of the outputs in the respective subset of outputs of the switch for the input of the switch from which said each resource request is received.

3. The method as claimed in claim 2, wherein the routing information stored in the memory is based on respective priorities assigned to the switch inputs by including different numbers of the switch outputs in the respective subsets.

4. The method as claimed in claim 1, wherein the resource requests received at each of a plurality of the inputs of the switch originate from a plurality of sources, the routing information stored in the memory defines for each source a respective subset of outputs of the switch to which resource requests from said each source should be routed, and the respective output of the switch to which said each resource request should be routed is selected by selecting one of the outputs in the respective subset of outputs of the switch to which resource requests from said each source should be routed.

5. The method as claimed in claim 1, wherein the routing information stored in the memory is based on respective priorities assigned to the sources by including different numbers of the switch outputs in the respective subsets.

6. The method as claimed in claim 1, wherein the routing information stored in the memory defines a plurality of subsets of outputs of the switch, and wherein the respective output of the switch to which said each resource request should be routed is selected by selecting one of the subsets, and then selecting the respective output of the switch to which said each resource request should be routed by selecting one of the outputs in the selected subset.

7. The method as claimed in claim 6, wherein the respective output of the switch to which said each resource request should be routed is a not-busy switch output selected in round-robin fashion from the selected subset.

8. The method as claimed in claim 1, which includes measuring loading characteristics of the resource requests concurrently with the routing of the resource requests, and wherein the routing information is changed based on the measured loading characteristics.

9. The method as claimed in claim 8, wherein the loading characteristics of the resource requests are measured concurrently with the routing of the resource requests by measuring a frequency at which resource requests are received at each of the inputs of the switch.

10. The method as claimed in claim 8, wherein the measuring of the loading characteristics of the resource requests includes computing a modulus from a network address intercepted from the data network, and indexing a table with the modulus to locate an accumulator for accumulating an occurrence of the network address intercepted from the data network.

11. The method as claimed in claim 1, wherein the changing of the routing information is performed concurrently with the routing of resource requests thorough the switch.

12. The method as claimed in claim 11, wherein the routing information for a resource request received at an input of the switch is changed in response to blocking of the resource request received at the input of the switch.

13. The method as claimed in claim 11, wherein the routing information is changed repetitively as a background process with respect to the routing of the resource requests through the switch.

14. A method of routing storage access requests from host processors through a switch to a data storage subsystem, said switch having inputs coupled to the hosts to receive the storage access requests from the hosts, and said switch having outputs coupled to the data storage subsystem to transmit the storage access requests to the data storage subsystem, said method comprising:
   a) storing, in a memory, routing information defining respective outputs of the switch to which storage access requests received at inputs of the switch should be routed;
   b) in response to storage access requests being received at the inputs of the switch, routing each storage access request received at each input of the switch to an output of the switch by accessing the routing information in the memory to select a respective output of the switch to which said each storage access request should be routed, and routing said each storage access request to the selected output of the switch to which said each storage access request should be routed; and c) changing the routing information stored in the memory based on loading characteristics of the storage access requests received at the switch inputs in order to balance loading of the storage access requests upon the outputs of the switch.

15. The method as claimed in claim 14, wherein the routing information stored in the memory defines for each input of the switch a respective subset of outputs of the switch to which storage access requests received at said each input of the switch should be routed, and the respective output of the switch to which said each storage access request should be routed is selected by selecting one of the outputs in the respective subset of outputs of the switch for the input of the switch from which said each storage access request is received.

16. The method as claimed in claim 15, wherein the routing information stored in the memory is based on respective priorities assigned to the switch inputs by including different numbers of the switch outputs in the respective subsets.

17. The method as claimed in claim 14, wherein the routing information stored in the memory defines for each host processor a respective subset of outputs of the switch to which storage access requests from said each host processor should be routed, and the respective output of the switch to which said each storage access request should be routed is selected by selecting one of the outputs in the respective subset of outputs of the switch to which storage access requests from said each host processor should be routed.

18. The method as claimed in claim 17, wherein the routing information stored in the memory is based on respective priorities assigned to the hosts by including different numbers of the switch outputs in the respective subsets.

19. The method as claimed in claim 14, wherein the routing information stored in the memory defines a plurality of subsets of outputs of the switch, and wherein the respective output of the switch to which said each storage access request should be routed is selected by selecting one of the subsets, and then selecting the respective output of the switch to which said each storage access request should be routed by selecting one of the outputs in the selected subset.

20. The method as claimed in claim 19, wherein the respective output of the switch to which said each storage access request should be routed is a not-busy switch output selected in round-robin fashion from the selected subset.

21. The method as claimed in claim 14, which includes measuring loading characteristics of the storage access requests concurrently with the routing of the storage access requests, and wherein the routing information is changed based on the measured loading characteristics of the storage access requests.

22. The method as claimed in claim 21, wherein the loading characteristics of the storage access requests are measured concurrently with the routing of the storage access requests by measuring a frequency at which storage access requests are received at each of the inputs of the switch.

23. The method as claimed in claim 21, wherein the measuring of the loading characteristics of storage access requests includes computing a modulus from a network address intercepted from the data network, and indexing a table with the modulus to locate an accumulator for accumulating an occurrence of the network address intercepted from the data network.

24. The method as claimed in claim 14, wherein the changing of the routing information is performed concurrently with the routing of storage access requests thorough the switch.

25. The method as claimed in claim 24, wherein the routing information for a storage access request received at an input of the switch is changed in response to blocking of the storage access request received at the input of the switch.

26. The method as claimed in claim 24, wherein the routing information is changed repetitively as a background process with respect to the routing of the storage access requests through the switch.

27. A switch for routing resource requests in a data network, said switch comprising:
   a plurality of inputs;
   a plurality of outputs; and
   a switch control computer programmed for routing the resource requests from the inputs to the outputs;
   wherein the switch control computer includes memory storing routing information, said routing information defining respective outputs of the switch to which resource requests received at the inputs of the switch should be routed; and
   wherein the switch control computer is programmed to respond to receipt of the resource requests at the inputs of the switch by routing each resource request received at each input of the switch to an output of the switch by accessing the routing information in the memory to select a respective output of the switch to which said each resource request should be routed, and to route said each resource request to the selected output of the switch to which said each resource request should be routed; and
   wherein the switch control computer is further programmed to change the routing information stored in the memory based on loading characteristics of the resource requests received at the switch inputs in order to balance loading of the resource requests upon the outputs of the switch.

28. The switch as claimed in claim 27, wherein the routing information stored in the memory defines for each input of the switch a respective subset of outputs of the switch to which resource requests received at said each input of the switch should be routed, and wherein the switch control computer is programmed to select the respective output of the switch to which said each resource request should be routed by selecting one of the outputs in the respective subset of outputs of the switch for the input of the switch from which said each resource request is received.

29. The switch as claimed in claim 28, wherein the routing information stored in the memory includes different numbers of the switch outputs in the respective subsets so that the switch inputs have different respective priorities.

30. The switch as claimed in claim 27, wherein the switch control computer is programmed to route resource requests received at each of a plurality of the inputs of the switch from a plurality of sources, the routing information stored in the memory defines for each source a respective subset of outputs of the switch to which resource requests from said each source should be routed, and the switch control computer is programmed to select the respective output of the switch to which said each resource request should be routed by selecting one of the outputs in the respective subset of outputs of the switch to which resource requests from said each source should be routed.

31. The switch as claimed in claim 30, wherein the routing information stored in the memory includes different numbers of the switch outputs in the respective subsets so that the sources have different respective priorities.

32. The switch as claimed in claim 27, wherein the routing information stored in the memory defines a plurality of subsets of outputs of the switch, and wherein the switch control computer is programmed to select the respective output of the switch to which said each resource request should be routed by selecting one of the subsets, and then selecting the respective output of the switch to which said each resource request should be routed by selecting one of the outputs in the selected subset.

33. The switch as claimed in claim 32, wherein the switch control computer is programmed to select the respective output of the switch to which said each resource request should be routed by selecting, in a round-robin fashion, a not-busy switch output from the selected subset.

34. The switch as claimed in claim 27, wherein the switch control computer is programmed to measure loading characteristics of the resource requests concurrently with the routing of the resource requests, and wherein the switch control computer is programmed to change the routing information based on the measured loading characteristics.

35. The switch as claimed in claim 34, wherein the switch control computer is programmed to measure the loading characteristics of the resource requests concurrently with the routing of the resource requests by measuring a frequency at which resource requests are received at each of the inputs of the switch.

36. The switch as claimed in claim 34, wherein the switch control computer is programmed to measure the loading characteristics of the resource requests by computing a modulus from a network address decoded from each resource request, and indexing a table with the modulus to locate an accumulator for accumulating an occurrence of the network address decoded from each resource request.

37. The switch as claimed in claim 27, wherein the switch control computer is programmed to change the routing information concurrently with the routing of resource requests thorough the switch.

38. The switch as claimed in claim 37, wherein the switch control computer is programmed to respond to blocking of a resource request received at an the inputs of the switch by changing the routing information for the blocked resource request.

39. The switch as claimed in claim 37, wherein the switch control computer is programmed to change the routing information repetitively as a background process with respect to the routing of the resource requests through the switch.

40. A program storage device containing a program for a switch for routing resource requests in a data network according to routing information stored in a memory, said routing information defining respective outputs of the switch to which resource requests received at the inputs of the switch should be routed; said program being executable by the switch for responding to receipt of the resource requests at the inputs of the switch by routing each resource request received at each input of the switch to an output of the switch by accessing the routing information in the memory to select a respective output of the switch to which said each resource request should be routed, and to route said each resource request to the selected output of the switch to which said each resource request should be routed; and wherein the program is further executable by the switch to change the routing information stored in the memory based on loading characteristics of the resource requests received at the switch inputs in order to balance loading of the resource requests upon the outputs of the switch.

41. The program storage device as claimed in claim 40, wherein the routing information stored in the memory defines for each input of the switch a respective subset of outputs of the switch to which resource requests received at said each input of the switch should be routed, and wherein the program is executable by the switch for selecting the respective output of the switch to which said each resource request should be routed by selecting one of the outputs in the respective subset of outputs of the switch for the input of the switch from which said each resource request is received.

42. The program storage device as claimed in claim 41, wherein the program is executable by the switch for including in the routing information different numbers of the switch outputs in the respective subsets so that the switch inputs have different respective assigned priorities.

43. The program storage device as claimed in claim 40, wherein the program is executable by the switch for routing resource requests received at each of a plurality of the inputs of the switch from a plurality of sources, the routing information stored in the memory defines for each source a respective subset of outputs of the switch to which resource requests from said each source should be routed, and the program is executable by the switch for selecting the respective output of the switch to which said each resource request should be routed by selecting one of the outputs in the respective subset of outputs of the switch to which resource requests from said each source should be routed.

44. The program storage device as claimed in claim 43, wherein the program is executable by the switch for including in the routing information different numbers of the switch outputs in the respective subsets so that the sources have different respective assigned priorities.

45. The program storage device as claimed in claim 40, wherein the routing information stored in the memory defines a plurality of subsets of outputs of the switch, and wherein the program is executable by the switch for selecting the respective output of the switch to which said each resource request should be routed by selecting one of the subsets, and then selecting the respective output of the switch to which said each resource request should be routed by selecting one of the outputs in the selected subset.

46. The program storage device as claimed in claim 45, wherein the program is executable by the switch for selecting the respective output of the switch to which said each resource request should be routed by selecting, in a round-robin fashion, a not-busy switch output from the selected subset.

47. The program storage device as claimed in claim 40, wherein the program is executable by the switch for measure loading characteristics of the resource requests concurrently with the routing of the resource requests, and wherein the program is executable by the switch for changing the routing information based on the measured loading characteristics.

48. The program storage device as claimed in claim 47, wherein the program is executable by the switch for measuring the loading characteristics of the resource requests concurrently with the routing of the resource requests by measuring a frequency at which resource requests are received at each of the inputs of the switch.

49. The program storage device as claimed in claim 47, wherein the program is executable by the switch for measuring the loading characteristics of the resource requests by computing a modulus from a network address decoded from each resource request, and indexing a table with the modulus to locate an accumulator for accumulating an occurrence of the network address decoded from each resource request.

50. The program storage device as claimed in claim 40, wherein the program is executable by the switch for changing the routing information concurrently with the routing of resource requests thorough the switch.

51. The program storage device as claimed in claim 50, wherein the program is executable by the switch for responding to blocking of a resource request received at an input of the switch by changing the routing information for the blocked resource request.

52. The program storage device as claimed in claim 50, wherein the program is executable by the switch for changing the routing information repetitively as a background process with respect to the routing of the resource requests through the switch.

53. A storage network comprising, in combination:

a cached storage subsystem including a plurality of storage devices, a cache memory linked to the storage devices for filling the cache with data from the storage devices, and a plurality of port adapters providing storage ports for access to the cache memory; and a switch having a plurality of inputs for receiving data access requests from a plurality of hosts, and a plurality of outputs linked to the storage ports for selectively routing data access requests from the inputs of the switch to the storage ports;

wherein the storage network includes a memory containing routing information, said routing information defining respective outputs of the switch to which storage access requests received at the inputs of the switch should be routed; said switch being programmed to respond to receipt of the storage access requests at the inputs of the switch by routing each storage access request received at each input of the switch to a selected output of the switch by accessing the routing information in the memory to select an output of the switch to which said each storage access request should be routed, and to route said each storage access request to the selected output of the switch to which said each storage access request should be routed; and wherein the storage network includes a processor programmed to change the routing information in the memory based on loading characteristics of the storage access requests in order to balance loading of the storage access requests.

54. The storage network as claimed in claim 53, wherein the processor is a switch control computer of the switch, and the memory is memory of the switch control computer.

55. The storage network as claimed in claim 53, wherein the switch includes a switch control computer for routing the storage access requests received at the switch inputs to the switch outputs, and said processor is a processor of a digital computer that is separate from the switch and that is programmed for monitoring host activity with respect to the storage network.

56. The storage network as claimed in claim 53, wherein the routing information stored in the memory defines for each input of the switch a respective subset of switch outputs to which storage access requests received at said each input of the switch should be routed, and wherein the switch is programmed to select the respective output of the switch to which said each storage access request should be routed by selecting one of the outputs in the respective subset of outputs of the switch for the input of the switch from which said each storage access request is received.

57. The storage network as claimed in claim 56, wherein the processor is programmed for including in the routing information different numbers of the switch outputs in the respective subsets so that the switch inputs have different respective assigned priorities.

58. The storage network as claimed in claim 53, wherein the routing information stored in the memory defines for each host a respective subset of outputs of the switch to which storage access requests from said each host should be routed, and the switch is programmed for selecting the respective output of the switch to which said each storage access request should be routed by selecting one of the outputs in the respective subset of outputs of the switch to which storage access requests from said each host should be routed.

59. The storage network as claimed in claim 58, wherein the processor is programmed for including in the routing information different numbers of the switch outputs in the respective subsets so that the hosts have different respective assigned priorities.

60. The storage network as claimed in claim 53, wherein the routing information stored in the memory defines a plurality of subsets of outputs of the switch, and wherein the switch is programmed for selecting the respective output of the switch to which said each storage access request should be routed by selecting one of the subsets, and then selecting the respective output of the switch to which said each storage access request should be routed by selecting one of the outputs in the selected subset.

61. The storage network as claimed in claim 60, wherein the switch is programmed for selecting the respective output of the switch to which said each storage access request should be routed by selecting, in a round-robin fashion, a not-busy switch output from the selected subset.

62. The storage network as claimed in claim 53, wherein the processor is programmed for measure loading characteristics of the storage access requests concurrently with the routing of the storage access requests, and wherein the processor is programmed for changing the routing information based on the measured loading characteristics.

63. The storage network as claimed in claim 62, wherein the processor is programmed for measuring the loading characteristics of the storage access requests concurrently with the routing of the storage access requests by measuring a frequency at which storage access requests are received at each of the inputs of the switch.

64. The storage network as claimed in claim 62, wherein the processor is executable by the switch for measuring the loading characteristics of the storage access requests concurrently with the routing of the storage access requests by computing a modulus from a network address decoded from each storage access request, and indexing a table with the modulus to locate an accumulator for accumulating an occurrence of the network address decoded from each storage access request.

65. The storage network as claimed in claim 53, wherein the processor is executable by the switch for changing the routing information concurrently with the routing of storage access requests thorough the switch.

66. The storage network as claimed in claim 65, wherein the processor is programmed for responding to blocking of a storage access request received at one of the inputs of the switch by changing the routing information for the blocked storage access request.

67. The storage network as claimed in claim 65, wherein the processor is programmed for changing the routing information repetitively as a background process with respect to the routing of the storage access requests through the switch.

* * * * *